Patented Sept. 14, 1954

2,689,170

UNITED STATES PATENT OFFICE 2,689,170

ORAL PREPARATION FOR INHIBITION OF DENTAL CARIES

William James King, River Edge, N. J., assignor to Colgate-Palmolive Company, Jersey City, N. J., a corporation of Delaware No Drawing. Application February 15, 1952, Serial No. 271,864

14 Claims. (Cl. 167—93)

The present invention relates to new and improved oral preparations and, more particularly, to dentifrice preparations having the effect of inhibition of dental caries in the oral cavity upon application.

Within the last several decades the problem of inhibition of tooth decay has been extensively investigated by research workers in the field. It is recognized that there are numerous and complex variables associated with such bio-chemical phenomena which are of consideration in the etiology and control of dental caries. Among the myriad of factors of consideration have been the rate of acid formation and/or neutralization in the mouth; type of diet; character of enamel and saliva; presence of bacteria; oral hygiene, etc. It is generally accepted that the decalcification of tooth enamel and the like characteristic of dental caries is caused to a large extent by the acids produced from the action of certain micro-organisms, which are normally present in the oral cavity or saliva, fermenting suitable carbohydrates therein.

Dentifrice and like preparations used on the teeth and gums have been a partial aid in the cleaning of the teeth and mouth. From time to time various proposals have been advanced relative to the development of "antiseptic" dentifrices and the like having allegedly the property of inhibition of tooth decay. Until recently, such claims were not substantiated by any factual evidence.

Within recent years the prior art has recognized that means for the prevention of tooth decay or at least its inhibition is a distinct possibility. The use of sodium fluoride by its addition to drinking water for a systemic effect or by topical application has received some degree of acceptance in the field. Likewise, penicillin has been used experimentally with some apparently desirable results, though this active ingredient may possess certain disadvantages such as sensitization of the patient, possibly rendering him susceptible to certain bacterial strains, etc.

Many commercial dentifrice preparations have incorporated therein minor amounts of certain wetting agents or detergents to provide desired detersive and foaming characteristics, e. g. water-soluble soaps, sulfated or sulfonated synthetic detergents. It has even been proposed that certain of these surface-active agents may have antiseptic or antibacterial activity of a temporary nature.

Despite the extensive research relative to the theory of the cause, the nature and the inhibition of dental caries, it is recognized that the problem of reducing the incidence of caries by an effective dental preparation remains a challenging one to the art. While a number of agents as indicated have been proposed as possibly preventing or neutralizing acid formation either by the use of enzyme inhibitors or by direct antiseptic action on the micro-organisms, the problem is much more complex due to the conventional use of dentifrice preparations by the consumer. It is necessary for proper action that any effective substance have a prolonged effect, such that its introduction into the oral cavity once or twice a day will be sufficient to inhibit the degradation process during the day, if not longer. In general, the proposed substances have been uniformly unsuccessful for any prolonged effect since their activity, if any, is generally persistent for only a short period of time of the order of minutes. Thus, in addition to the need for the discovery of an effective agent, a primary difficulty is that some practicable means unique with and characteristic of such agent must be available whereby the inhibitor can be maintained at an effective concentration in the mouth at all times.

The problem is rendered even more complex by the necessity that the ingredient possess certain requisite supplementary characteristics such as satisfactory properties from the viewpoint of acute oral toxicity, acute chronic toxicity, non-sensitization, non-irritation to the mucous membranes, etc.

The formulation and manufacture of dentifrice preparations such as toothpastes and the like are highly varied in commerce. The incorporation of an effective agent of the character indicated in such a preparation is usually a specialty problem and often beset with many difficulties unique therewith, which will be apparent from the following description. A few of the vital considerations are set forth below individually. Thus, it is requisite that the ingredients be compatible with the active ingredient which must be stable and active in the formulation; proper solubility characteristics, adequate concentration of solids, controlled foaming power, stability and homogeneity of the formulation at normal and reasonably adverse conditions, non-irritability, a pleasant taste and like considerations are of prime concern also to the commercial practicality and acceptability of the product by the consumer.

As the culmination of a vast amount of research, it has now been discovered that a practical and commercially acceptable dentifrice preparation may be prepared which has in its unitary effect the prevention or inhibition of dental caries, in addition to many other advantages of the character previously described above.

Broadly, the present invention relates to an oral preparation for the inhibition of dental caries having as the active ingredient a substantially saturated higher aliphatic acyl amide of a saturated aliphatic monoaminocarboxylic acid compound, as hereinafter described and claimed. One of several embodiments of the present invention comprises a smooth homogeneous dental cream extrudible from a collapsible tube by manual pressure thereupon, and having as the active ingredient, a condensation product of a higher fatty acylating substance and an amino carboxylic acid compound, said product comprising essentially the higher fatty acyl amide of said amino acid, and being further characterized by its substantial freedom from fatty acid material. Another aspect involves the use of the active ingredients in an effective amount up to five percent by weight, and preferably up to four percent, in practical formulation of a commercially acceptable dentifrice. In a preferred embodiment, the invention further relates to a dental cream comprising a suspension of an essentially water-insoluble abrasive or polishing agent in a gel, said cream containing up to five percent by weight of a condensation product comprising essentially an amide compound having the formula:

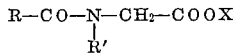

wherein R—CO— is a higher saturated fatty acyl radical of 12 to 16 carbon atoms, R' is selected from the group consisting of hydrogen and lower alkyl, and X is selected from the group consisting of hydrogen and water-soluble salt-forming cations, and less than about fifteen percent by weight of a higher fatty acid material selected from the group consisting of higher fatty acids and soaps thereof based on said amide, the amount of said material being insufficient to substantially adversely affect said amide. Where the term "fatty acid material" or "higher fatty acid material" is used herein it refers to higher fatty acids and soaps thereof. In general, the amount of fatty acid material is preferably less than ten percent by weight of the amide, and optimum results are obtained with not substantially above five percent. Preferred active ingredients are lauroyl, myristoyl, and palmitoyl amides of sarcosine, glycine and their water-soluble salts and the like of necessary purity.

Various other significant features of the present invention will be apparent in the following description.

The properties of these active ingredients towards the inhibition of dental caries for a prolonged period of time have been established satisfactorily. The active ingredients of the present invention are characterized by the fact that they exhibit the dual function of inhibiting acid production from suitable carbohydrates fermented by caries-active saliva and of adsorption and release by proteinaceous material. While the invention is not limited to any particular theory, it is believed that the effectiveness of these compounds in the oral cavity for a prolonged period of time is due to the combination of its acid-inhibitory action and its adsorption within the oral cavity, probably on the mucin plaque, whereby it remains active during the subsequent period of ingestion of carbohydrates. The term "adsorption" is used herein illustratively as denoting the retention permitting residual activity of these active ingredients since the specific mechanism, whether adsorption, absorption or some other physical and/or chemical action remains undetermined at this time.

These essential properties of the active ingredients may be illustrated by various in vitro tests tests for the measurement of caries activity, such tests offering a high degree of correlation with in vivo results.

The inhibiting effect on acid production from a nutrient medium using caries-active saliva in the presence of these active ingredients may be initially determined by a dilution test using a Snyder medium as described below. The Snyder test is well known in the art and is based on the rate of change of the color of an indicator, Brom-cresol-green, in a dextrose agar culture medium adjusted to a pH of 4.8–5.0 when it is inoculated with caries-active saliva. Ordinarily, a test tube of such Snyder medium which has been treated with caries-active saliva will turn from a green to a yellow color within 24 hours indicating acid production. Such color change generally occurs over the pH range of about 4.4 to 4.1. Each active ingredient may be added in varying amounts to such media which have been inoculated with caries-containing saliva. The minimum amount of each active ingredient which is necessary to maintain a predominantly green color for 72 hours incubation at 37° C., and therefore inhibit acid production, is called herein the "dilution minimum." This "dilution minimum" is measured or calculated in milligrams per 100 cc. of caries-active saliva and represents the relative effectiveness of the active ingredients in the inhibition of the acid production which normally results from the action of the caries-active saliva on the nutrient carbohydrate medium. More specifically, these tests may be conducted by heating 10 cc. of sterile dextrose agar, containing the color indicator, in a test tube to liquefy the same, adding to the agar media while at a temperature of about 50–60° C. a quantity of 0.2 cc. of caries-active saliva and about 0.1–0.5 cc. of any convenient solution of the active ingredient, and determining thereby the minimum amount of active ingredient which is necessary to maintain the desired color. The minimum number of mg. of active ingredient which is effective per 100 cc. of the saliva may be calculated from the quantities used in the test tubes.

A positive showing that these test substances may inhibit acid production by caries-active saliva in suitable nutrient media is not per se indicative of its prolonged effectiveness in the oral cavity which is essential to practical inhibition of dental caries. Accordingly, it proved necessary to develop a suitable test which would be indicative of the desired type of prolonged activity and which would differentiate or measure the relative effectiveness of these inhibitors. A suitable procedure was developed which is hereinafter called the protein adsorption test. This test is highly specific such that many materials which have the power of inhibition in the Snyder medium as above-described are not adsorbed by suitable protein material.

Such a protein adsorption test consists essentially of using a dilute solution of the active ingredient to treat mucin or essentially equivalent material such as casein, washing and drying the treated casein or the like, and adding the same to the above-described Snyder medium inoculated with caries-active saliva. If a predominantly green color persists after 72 hours incubation, then a sufficient amount of the active ingredient must have been retained by the protein and subsequently released in the Snyder medium. By lowering the amount or concentration of the active ingredient in the solution used to treat the casein, or by reducing the amount of active ingredient-treated casein added to the Snyder medium, there may be determined similarly a minimum quantity of the active ingredient per 100 cc. of caries-active saliva below which inhibition of acid production did not occur, this measure being herein called the "protein adsorption minimum."

The method for computing the amount of inhibitor in the protein adsorption test is as follows. One gram of casein is placed in 50 cc. of a dilute solution (e. g. 0.25%) containing $x$ mg. of active ingredient to be tested. Therefore, if complete adsorption takes place, $x$ mg. will be picked up by one gm. of casein. Thereafter $y$ mg. of the treated casein is placed in an agar tube containing 0.2 cc. of saliva. To determine the amount of active ingredient available for 100 cc. of saliva the following formula is used:

$$\text{mg./100 cc. of saliva} = \frac{y \cdot x}{1000} \cdot 500 = \frac{xy}{2}$$

The factor $$\frac{y \cdot x}{1000}$$

is the number of mg. of active ingredient per 0.2 cc. of saliva which is multiplied by 500 to convert to the standard of mg./100 cc. of saliva.

If the minimum amounts necessary for inhibition of color change and therefore acid production in the first Snyder-type dilution test is known, and if the protein adsorption is also known, then the per cent of active-ingredient which must have been carried over, adsorbed and released by the casein can be calculated as follows:

Thus percent absorption=

$$\frac{\text{Snyder dilution minimum}}{\text{Protein adsorption minimum}} \times 100$$

The following table summarizes the data on various substantially pure active ingredients of the present invention.

TABLE I

| Compound | Snyder Dilution Min., mg./100 cc. Saliva | Protein Ads. Min., mg./100 cc. Saliva | Percent Adsorbed and Effective |
|---|---|---|---|
| 1. Sodium N-Lauroyl sarcoside | 30 | 5,000 | 0.6 |
| 2. Potassium-N-Lauroyl sarcoside | 30 | 5,000 | 0.6 |
| 3. Sodium-N-myristoyl sarcoside | 20 | 11,500 | 0.17 |
| 4. Sodium-N-palmitoyl sarcoside | 40 | 22,500 | 0.16 |
| 5. Sodium-N-lauroyl glycide | 30 | 5,000 | 0.6 |
| 6. Sodium-N-myristoyl glycide | 5 | 12,500 | 0.04 |
| 7. Lauroyl sarcosine (35% alcohol solution) | 32.5 | 6,250 | 0.5 |

Referring to the data above, the first column giving the "dilution minimum" illustrates the relative effectiveness of these active ingredients on inhibiting acid production upon direct contact. Thus, sodium myristoyl glycide (No. 6) required only about 5 mg. to inhibit acid production under the test conditions, whereas sodium lauroyl sarcoside (No. 1) or glycide (No. 5) required about 30 mg. each for equivalent effect.

As previously indicated, however, such inhibiting or bacteriostatic action is not indicative per se of the maintenance of the effectiveness of the active ingredients in the oral cavity for a prolonged period of time. It is necessary for the inhibition of dental caries that these substances be sufficiently adsorbed such that a continuous inhibiting action is possible. This factor which is of the primary consideration is illustrated in the second column giving the approximate "protein adsorption minimum" for each active ingredient which was determined using casein. It may be noted that it required with the lauroyl sarcoside (No. 1) and glycide (No. 5) about 5,000 mg. each to completely inhibit acid production whereas about 12,500 mg. were required with the use of the myristoyl glycide (No. 6). Thus, even though this latter myristoyl compound was about six times more effective than either of the former lauroyl derivatives upon direct contact with the saliva, yet it required about 2½ times of this myristoyl derivative to accomplish an equivalent effect where the factor of adsorption on protein is involved.

The third column giving the percent of active ingredient adsorbed is illustrative of the protein adsorption phenomenon. It shows, for example, that about 15 times greater adsorption occurred using the lauroyl derivatives 1 and 5 above in comparison to the No. 6 myristoyl compound (0.6%:0.04%).

The general effectiveness of all these active ingredients is clearly evident from the data above. In general, it is considered that they should each exhibit a protein adsorption minimum of up to about 25,000, and preferably 15,000 mg. using casein as the protein. The alkali metal salt derivatives such as sodium and potassium appear to be equally effective and yield usually optimum results in comparison to other water-soluble salts. Optimum effects appear usually with the lauroyl derivatives though the other higher fatty acyl radicals are active in the relationship set forth.

The inhibitory character of such materials in the formulations of the present invention and the reliability of the testing procedures for the active ingredients have been confirmed by clinical and in vivo tests on both human beings and animals. These active ingredients exhibit the desired prolonged ability to inhibit acid production from suitable carbohydrates in the oral cavity when formulated into a dental cream in a collapsible tube or the like and utilized in the ordinary or conventional manner. As an illustration, a group of individuals brushed their teeth twice a day in the usual manner with such an extrudible cream toothpaste containing about 2% of sodium lauroyl sarcoside. Several hours after a brushing of the teeth with this cream, pH measurements were taken on the dental plaque of the teeth before and after a 50% glucose rinse at weekly intervals. A similar group was employed which utilized a control dental cream for comparison purposes. This control dental cream had substantially the same formulation, with the exception that a detergent was substituted for the sarcoside. After a number of weeks, the groups exchanged dental creams. In the table below, the average initial pH is the average pH reading on the teeth before the glucose rinse used hours after brushing of the teeth, the average minimum pH is a similar reading after the glucose rinse, and the average pH drop is the difference of the above two averages, and represents the increase in acidity due to the degradation of the glucose in the mouth. The results noted are as follows:

TABLE II

*Plaque pH measurements*

| Dental Cream | Subjects | Initial | 1st Week | 2nd Week | Change to— | After 1 wk. |
|---|---|---|---|---|---|---|
| Sodium lauroyl sarcoside dental cream group. | Av. Init. pH | 6.0 | 6.2 | 6.0 | Control Dental Cream. | 6.4 |
| | Av. Min. pH | 5.1 | 5.9 | 5.8 | | 5.2 |
| | Av. pH drop | 0.9 | 0.3 | 0.2 | | 1.2 |
| Control Dental Cream group. | Av. Init. pH | 6.3 | 6.3 | 6.2 | Sarcoside dental cream. | 6.3 |
| | Av. Min. pH | 5.4 | 5.4 | 5.4 | | 6.0 |
| | Av. pH drop | 0.9 | 0.9 | 0.8 | | 0.3 |

It is to be noted that the sarcoside-containing dental cream of the present invention maintained the minimum pH of the dental plaque at a desirably high level and a very small average pH drop after the glucose rinse, in comparison to the results achieved with the control dental cream. The effects are all the more striking when both groups exchanged the dental creams. It appears that the initial sarcoside group receded to its original procedure of forming acid readily and in fairly large quantities following a glucose rinse when using the control dentifrice. In contrast thereto, the initial control toothpaste group began to show the desired improvement characteristic of the sarcoside-containing toothpaste after using the latter for a relatively short time.

Further extensive research relative to such higher fatty amides of amino acid compounds discloses that they are essentially non-toxic in normal use. It has been determined, for example, that sodium lauroyl sarcoside has extremely low acute and chronic toxicity values, and exhibits no apparent sensitization of the subjects or irritation to the mucous membranes. In addition to the above properties, laboratory tests indicate that the active ingredients possess the property of reducing the solubility of tooth enamel in acid, but to varying degrees. Such laboratory tests for evaluating the reduction in enamel solubility after exposure to test substances are known. Data obtained in such tests with the active ingredients indicate, for example, that sodium N-lauroyl sarcoside reduces enamel solubility slightly, that sodium N-myristoyl sarcoside reduces it to a somewhat greater degree and that sodium n-palmitoyl sarcoside reduces it to a still greater degree approximating that obtained with sodium fluoride.

In general, the suitable active ingredients are the higher fatty amides of lower aliphatic amino carboxylic acid compounds, such as those having about 12 to 16 carbon atoms in a long-chain fatty acyl radical. Optimum results are achieved with the dodecanoyl, tetradecanoyl, and hexadecanoyl derivatives. These compounds may be produced by the condensation of the higher fatty acylating substance with the suitable amino compound as further described below. The lower amino acid portion of these active ingredients is generally derived from the lower aliphatic saturated amino carboxylic acids, such as, for example, those having 2 to about 6 carbons, usually the monocarboxylic acid derivatives. It is preferred that the compounds be derived from the amino substituted lower alkane carboxylic acids, such as the mono-amino substituted alkane monocarboxylic acids, such as the mono-amino substituted alkane monocarboxylic acids, particularly the alpha amino substituted acids. Suitable amino acids from which the higher fatty amides thereof may be derived are amino-ethanoic acid (glycine), methylaminoethanoic acid (sarcosine), 2-aminopropanoic acid (alanine), 3-aminopropanoic acid, valine, etc. It is preferred to use the amides of those acids having 2 to 5 carbon atoms, and more particularly, the sarcoside and glycide derivatives and their homologues having up to about 5 carbon atoms in the amino acid portion of the molecule in view of the excellent results obtained by their use.

Such amides of amino carboxylic acid compounds are to be generally employed in the form of their free acids or preferably as the water-soluble salts thereof. In general, the desired salts are the water-soluble carboxylate salts such as the alkali metal (e. g. sodium, potassium, etc.), ammonium, amine, alkylolamine (e. g. mono-, di-, tri-ethanolamine), salts, etc., suitable examples being set forth in Table I above. For convenience herein, reference to "amino carboxylic acid compound," "sarcoside," "glycide," etc. refers to such compounds having a free carboxylic group or the water-soluble carboxylate salts.

These amides should be utilized in pure or substantially pure form and may be produced in any suitable manner provided the compounds possess the indicated acid-inhibiting and protein adsorption capacity. The production or presence of fatty acid material with the amide compounds is inherent in most commercial methods of manufacture of these amide compounds. It has been found that, in the condensation of the suitable fatty acid derivative with amino acid compound, the quality of the reaction mixture or resulting condensation product is an essential consideration. Unless proper controls are exercised, the condensation products or mixtures may be admixed with fatty acid material which substantially adversely affect the activity of the active ingredients in the relationship set forth. Such condensation products or mixtures may be suitable per se for many purposes such as general cleansing uses, etc. It is requisite to their effectiveness in the present invention that these condensation products be prepared by a controlled condensation reaction and/or purification to insure the formation and recovery of a condensation product sufficently free of fatty acid material to have the desired properties.

It is an embodiment of the present invention that there is employed as the active ingredient, the condensation mixture of a higher fatty acylating compound with an amino carboxylic compound, said condensation mixture comprising essentially the higher fatty acid amide of said amino acid and being substantially free from or having a minor amount of higher fatty acid material. Such condensation products or mixtures are highly advantageous since they can be obtained in a convenient and economical manner and produce similarly a high degree of activity. It is critical that the amount of fatty acid material in the condensation product be controlled since excessive amounts substantially adversely affect the prolonged inhibition of acid formation in the mouth. The tolerable amount of fatty acid material will vary in degree with the specific active ingredient, specific type of soap material, etc.

In general, the concentration of fatty acid material in the product should be less than about 15% by weight of amide, and preferably less than about 10%, and insufficient to substantially deactivate the amide compounds. It is considered that the amount of fatty acids or soaps should be not substantially in excess of about five percent for optimum effects. Thus, it will be noted that the ratio of higher fatty acid material or the like to the amide compound preferably should be of the order of a maximum of about 1:10 by weight, usually about 1:15, with about 1:20 maximum desired. For example, a mixture of 100 parts of sodium lauroyl sarcoside and about 3 parts of sodium laurate exhibits a protein adsorption minimum with casein of the order of about 5000 mg. per 100 cc. of caries-active saliva despite the fact that it has been determined that the soap per se has essentially no activity in the protein adsorption test.

The amount of fatty acid material such as soap in the condensation product may be determined by any suitable means. Depending upon the amount of soap present therein, the mixture may be analyzed conveniently using several techniques, such as X-ray diffraction on a film, use of a Geiger counter-X-ray spectrometer, chromatographic adsorption, etc.

The desired condensation products or compatible mixtures may be prepared in any suitable manner such as by the condensation of a higher fatty acylating substance with the amino acid and controlling the amount of fatty acid material in the final condensation mixture to within the indicated values and effectiveness in the tests.

The higher fatty acylating substances may be derived from pure or commercial grades of lauric or myristic acids and the like. More particularly, these acids may be produced from fatty oils, fats, greases, and other natural sources or be of synthetic origin as derived from the oxidation of hydrocarbons. According to its origin and the degree and manner of purification, lauric and myristic acids may be commonly admixed or associated with other fatty acids of higher and lower molecular weight. It is within the scope of the invention that the lauroyl and myristoyl compounds may be associated with other fatty substances and the like provided the character and amount of such other materials are not sufficient to substantially neutralize or materially affect the therapeutic activity of the active ingredients in the relationship set forth. Thus, there may be suitably employed for the preparation of the amides the commercially pure lauric and myristic acids having a concentration of such acids of about 90% and above. A typical composition of commercially pure lauric acid may be 90% lauric acid, the remainder being essentially myristic and capric acids.

Similarly, pure or commercial grades of the amino acids may be used under like considerations. A suitable commercial material is an aqueous solution of about 13% sarcosine containing minor amounts of disarcosine, etc.

It is preferred to condense the suitable higher fatty acid halide with the salt of the amino acid in the presence of a hydrogen halide acceptor or base and separating the resulting amide with a small amount of fatty acid material.

The fatty acid halide and amino acid may be employed in any suitable proportion to form the desired mono-molecular condensation products. Generally, no external heat need be applied; the exothermic heat of the reaction usually resulting in elevating the temperature to about 50 to 60°. If desired, elevated temperatures such as up to refluxing temperatures may be employed satisfactorily. Excessive elevated temperatures tend to increase the yield of undesirable materials. The reaction is preferably conducted in an aqueous-containing medium. The amount of water utilized is not critical and is sufficient to form a fluid reaction medium. Suitable organic solvents may be substituted either in part or whole for water as the solvent medium, such as pyridine, etc.

It is essential that this process is conducted in the presence of a hydrogen halide acceptor in order to maintain a necessary alkalinity of solution and to neutralize the hydrogen halide which is liberated by the condensation between the fatty acid chloride and the amino group. In the absence of a sufficient quantity of this basic acceptor such as sodium hydroxide or the like, the liberated hydrogen chloride will bind the amino group by salt formation and result in marked incomplete condensation. The acceptor may be any suitable base or alkaline substance capable of neutralizing both newly liberated hydrogen halide eliminated by the condensation reaction and any hydrogen halide previously combined with the amino group whereby said amino group is free to react with the fatty acid halide to form the corresponding amide. Any suitable neutralizing agent may be employed such as the alkali metal hydroxides (e. g. sodium, potassium and lithium hydroxide), potassium carbonate, sodium carbonate, calcium hydroxide, magnesium hydroxide, etc., as well as organic bases such as tertiary amines, e. g. trimethylamine, pyridine, etc. Such acceptor for hydrogen halide should usually be employed in at least about stoichiometric or equivalent amounts of reactants, since for example one mole of alkali metal hydroxide acceptor will neutralize a mole of liberated hydrogen halide produced by the condensation of one mole of each of the reactants.

This condensation reaction should necessarily be conducted in the presence of the base or alkaline medium for additional reasons. The amino carboxylic acid possesses both basic and acidic groups per se, and is recognized as existing in solution in the form of zwitterions, or inner salts. Unless the carboxylic group is blocked such as by salt formation and the amino group rendered free for condensation thereby, incomplete condensation will result also due to loss of reactable amino acid material. Thus, the salt of the amino acid, preferably the water soluble salts, e. g. sodium salt of sarcosine, should usually be used as the initial reacting material. Any of the neutralizing agents or bases previously set forth may be used to form the corresponding salts if desired. Alternatively, the amino acid per se may be used initially and sufficient alkali or other base to insure salt formation of the carboxyl group being added prior to or during the admixture of the reactants.

The presence of the base or alkaline medium therefore will insure substantial freedom from inner salt formation of two polar groups of the amino acid during the reaction. In an aqueous-containing medium, the reaction will be forced to a high degree of completion by maintenance of an alkaline pH until the end of the reaction, e. g. at least about 9. The completion of the reaction may be determined in any suitable manner such as, for example, when the pH of the reaction mixture has become constant.

It is noted that the condensation reaction inherently produces equivalent molecular quantities of the desired amide and of the hydrohalic acid which is converted to the halide salt. Such salts, which are preferably inorganic salts, e. g. sodium or potassium chloride, as formed by the reaction of the hydrohalic acid and suitable metallic base, should in general be removed from the product in any suitable manner, such as by solvent extraction of either the amide product or inorganic salt, or by acidification of the reaction mixture followed by washing with an aqueous medium, preferably aqueous sulfuric or similar mineral acid solution, which will preferentially dissolve the inorganic halide salts. This condensation product in the form of its free acid may be used per se or, if desired, it may be converted into any desirable carboxylic salts by reaction with the appropriate base such as alkali metal bases, ammonium hydroxide, etc.. In the case of a strong alkali such as sodium hydroxide, the pH should be adjusted to about 9.0 to 9.5 in order to obtain substantially complete salt formation and obtain a neutral product.

These halide salts are in general undesirable in the formulation of extrudible gelled dental creams when present in any appreciable quantity. For example, sodium or potassium chloride in any significant amount such as about one percent in a dental cream appears to cause corrosion of collapsible tubes such as aluminum tubes, adversely affects the taste and flavor of the creams, and the stability of the gel per se. Furthermore, potassium chloride has a signficant adverse effect on Irish Moss gum, for example, present in such a preparation. Thus, it is considered that the condensation product usually should be essentially free of halide salts, particularly for dental cream formulations.

As indicated, it is an essential consideration that the proportion of amide and fatty acid material be maintained within the desired limits. The presence of the undesirable fatty acid material may be derived from a number of possible sources, a few of which are set forth below illustratively. The acid halide used as a reactant is usually prepared from the free fatty acids by reaction with phosphorus trichloride or the like. This preparation is essentially a rate reaction which takes an unduly long time for completion. Since the presence of controlled amounts of fatty acid material may be tolerated in the product, it is possible to use as a reactant a mixture of the acid halide and a minor amount of free acid. This mixture may be obtained from the reaction mass forming the acid chloride without waiting for full conversion of the acid to the acid chloride. A suitable reactant thus is lauroyl chloride containing minor amounts of the order of up to a few percent of lauric acid. This minor quantity of lauric acid admixed with the acid chloride will generally result in the formation of fatty acid soaps during the condensation of the acid chloride with the amino acid. If desired, the amount of free fatty acids may be maintained at a minimum by any suitable means, such as by the distillation of the acid chloride to remove or separate fatty acids therefrom. Another possible means for soap or fatty acid formation is from the hydrolysis of some acid chloride in the aqueous (including aqueous-containing) medium. An aqueous wash of the reaction mixture will also have a tendency to hydrolyze any free residual acid chloride to form free fatty acids or soaps thereof. The invention is not of course limited to any particular theory for the presence of controlled amounts of fatty acid material.

Acylating agents other than the fatty acid chloride are suitable and well known in the art. Other suitable fatty acid halides are the corresponding bromides and iodides. Alternatively, the higher fatty acids, acid anhydrides and esters may be suitably employed, the amount of fatty acid material in the final condensation product being controlled suitably.

Where the amount of fatty acid or the like in the condensation product is excessive, its concentration may be sufficiently lowered by any suitable means. Conventional purification techniques which may be employed to separate fatty acids or soaps from the fatty acid amides or their salts include recrystallization, distillation, preferential precipitation of salts, etc. For example, the condensation product or mixture in the form of fatty acid soaps and the salts of the fatty amides of amino acids may be subjected to recrystallization from ethyl alcohol whereby the soap concentration is decreased substantially. It is thus within the scope of the present invention also to use the mixture produced by the condensation of the acid halide or the like with the amino acid salt and separating thereafter fatty acid material from the reaction mixture.

By such various controls, it is practical to produce a substantially pure mixture of the amides and minor quantities of fatty acid material which possesses the desired properties. The amide will be at least about 90%, and preferably 95% by weight of these two organic ingredients, and the amount of soap or the like will be at suitably low values, e. g. from about 0.5% up to about 10% and usually from 0.5 to about 5% of said amide. The product is preferably substantially free of chlorides or the like, and may have minor amounts of essentially inert materials admixed therein.

The active ingredients of the present invention may be prepared in any suitable form for manufacture of the dentifrice. They may be prepared conveniently in particulate form by subjecting an aqueous slurry or solution thereof to any conventional drying means, e. g. drum-drying, and preferably to spray-drying to form essentially homogeneous particles capable of rapid dissolving action. In such manufacture, the aqueous solution, or other suitable solvent, is atomized and converted into droplets which are subjected to a current of drying gas such as heated air to solidify the active ingredients in the form of hollow beads. Alternatively, they may be utilized in powder or crystal form or in the form of a suitable solution, depending upon the type of preparation and its manner of manufacture.

Thus, these active ingredients may be utilized in any preparation designed for application to the oral cavity which are referred to herein as dental preparations. Accordingly, there may be prepared suitable tooth powders, tooth pastes, creams in collapsible tubes, lozenges, liquid dentifrices, mouth washes, etc.

Any suitable amount of active ingredient may be incorporated in the dentifrice preparations. The specific concentration of active ingredient thereof will vary naturally, depending on the specific type of preparation, the portion conventionally used by the consumer, the usual frequency of use, and, in particular, with the specific effect produced by varying amounts of the active ingredients.

In general, these therapeutic agents should be employed in any effective amount up to about five percent by weight of the finished formulation. In practice, it will be found that amounts up to about four percent will usually be sufficient, particularly for tooth powders and creams. A practical and commercially acceptable dental cream may be prepared within these limits, with optimum desired effects from a consideration of all factors usually dictating the use of any effective amount within the range of about 0.5% to about 4% active ingredient in the formulation. Best results, wherein the material is effective for an adequate period in the oral cavity and which is most conducive to a commercially acceptable dental cream, have been achieved with the use of about 1-3% by weight. Excessive amounts substantially above 5% are in general highly undesirable and substantially adversely affect the quality of such products. Products containing such excessive amounts possess, for example, a significant bitter fatty acid type or bite taste which has even resulted in refusal of a number of subjects to use the same. Furthermore, the undesirabel teste cannot be sufficiently masked by modification or increase in sweetening or flavoring agents from the practical point of view and cannot, therefore, convert such a generally unsalable product into one which is practical and commercially acceptable to the public as a whole. Such products containing excessive amounts of active ingredients produce an inordinate amount of foam similar to frothing upon application in the mouth, thereby similarly rendering the product unacceptable for widespread acceptance.

Such excessive amounts have further been found to be highly detrimental in dental creams, resulting in a tendency to non-uniformity and non-homogeneity of the product, and instability upon aging or storage. These dental creams are generally an admixture of suitable abrasive or polishing agents and suitable liquids proportioned so as to form a smooth, homogeneous cream-like paste. It is requisite that they shall be free of separate or discrete lumps or particles and flow from the tubes under pressure without segregation or deterioration. The presence of excessive amounts of active ingredients therein results in a graininess in the product which is undesirable in appearance and may even be palpable in the mouth. Furthermore, upon storage at elevated temperatures, there is an increased tendency for phase separation of a distinct liquid and a solid phase in contrast to a homogeneous cream, such that upon application of pressure to the tube there is extruded a liquid or foam, usually dark-colored, rather than a smooth paste. Such effects will vary in degree of course with the specific formulation but it is apparent that they similarly destroy the essential character of the dental cream as a smooth, homogeneous, stable, extrudible mass.

It is common to incorporate various adjuvant materials in oral preparations. The final dentifrice formulation may contain such materials in suitable amounts provided they are compatible with the active ingredient and the essential properties of the dentifrice preparations of the present invention. Added materials in the formulation which do not substantially adversely affect the properties and characteristics may be suitably selected and used in proper amount depending upon the particular type of preparation. Such materials may be used as soluble saccharin, flavoring oils (e. g. oils of spearmint, peppermint, wintergreen), coloring or whitening agents (e. g. titanium dioxide), preservatives (e. g. sodium benzoate, etc.), alcohol, menthol, etc., in addition to other added materials or the like which are described in the present specification.

Any suitable essentially water-insoluble abrasives or polishing agents may be employed in dentifrice preparations such as tooth powders, pastes, creams and liquids as an aid in general cleansing. Among such abrasives are calcium carbonate, dicalcium phosphate, tricalcium phosphate, aluminum hydroxide, insoluble sodium metaphosphate, bentonite, etc., including suitable mixtures thereof. In general, these materials will usually comprise the major proportion of the solid ingredients. The amount utilized is variable with respect to the abrasive effects desired and the particular type of preparation but usually will be from about 5-95% by weight of the total composition and more particularly from about 20-75% in a dental cream.

It is preferred to use in dental cream formulations in part or whole as the suitable abrasives calcium carbonate and calcium phosphates, preferably the latter type such as dicalcium phosphate, in view of their ease of formulation and the obtaining of smooth consistency, body and stability in the dental cream.

In the preparation of tooth powders, it is usually sufficient to mechanically admix the various solid ingredients, the abrasives constituting the major amount, e. g. at least about 70%. In dental cream formulations, the liquids and solids must necessarily be proportioned to attain a creamy mass of desired consistency. In general, the liquids will comprise chiefly such materials as water, glycerine, sorbitol, propylene glycol, including suitable admixtures thereof. There is included within the scope of the invention both water-free and humectant-free creams. It is advantageous to use a mixture of both water and a humectant such as glycerine, sorbitol, etc. in view of a good consistency attainable therein initially and upon storage, the hygroscopicity and plasticizing action of the mixture preventing appreciable hardening of the cream, and aiding in maintenance of proper solubilization effects and relationships.

For optimum effects, the active ingredient should be suitably dissolved or dispersed in the liquid phase or vehicle and the essentially water-insoluble abrasive maintained in suspension, the cream being gelled or set to maintain the mixture as stable as possible. The formation of a gel favorably affects the stability of the cream. Any suitable gelling agent or hydrophilic colloid may be employed which has the necessary swelling and setting action. The gelling agents are preferably the natural and synthetic gum and similar gum-like materials such as Irish moss, gum tragacanth, sodium alginate, gum karaya, pectin, sodium carboxymethylcellulose, starch, etc. Such materials as tragacanth glycerite or glycerite of starch which are essentially mixtures of glycerine and the mucilaginous substance are included herein. These gums will usually be employed in amounts up to about 10% by weight of the dental cream, and about 0.5-5% usually.

As an embodiment of the present invention, a commercially acceptable and substantially uniform, homogeneous and stable dental cream having the essential property of inhibiting tooth decay may be prepared by suitable proportioning of the following ingredients within the specified ranges to produce a cream extrudible from a collapsible aluminum or lead tube or the like:

| | Percent |
|---|---|
| Active ingredient | 0.5-5 |
| Water-insoluble abrasive | 20-75 |
| Liquid vehicle | 20-75 |
| Gelling agent | 0-10 |

Minor amounts of flavor, sweetener such as soluble saccharin, etc., will also be added usually. The liquid vehicle is preferably water, or a liquid humectant or excipient such as glycerine, sorbitol, etc., and suitable mixtures thereof, the total liquid content being usually in an amount from about 30-65% by weight of the total ingredients. Preferred creams of the present invention which yield optimum results have the proportions below, the amounts in parentheses being highly desirable in commercial practice.

| | Percent | |
|---|---|---|
| Active ingredient | 0.5-4 | (1-3) |
| Water-insoluble abrasive, preferably containing insoluble phosphate | 30-65 | (40-60) |
| Glycerine (or the like) | 5-50 | (10-40) |
| Water | 5-50 | (10-40) |
| Gelling agent | 0.1-5 | (0.5-1.5) |

The pH of the dental cream is variable and may be slightly alkaline or acid as desired since the saliva is a buffered medium. The pH of a 20% aqueous slurry of the cream will be usually about 5 to about 10. It is preferred that it be substantially neutral, e. g. about 6-8, for optimum effects.

As previously indicated, mouth washes or rinses are also within the scope of the present invention. Such products are usually an effective amount of the active ingredient dissolved in a suitably flavored liquid vehicle, preferably aqueous alcoholic vehicle. While amounts of up to five percent active ingredient may be used, it is desirable to use about 0.05 to about 2%, and preferably up to about 1% by weight. The alcohol concentration may vary depending on the mouth effect desired, such as about 5-70% alcohol, and preferably 5-40%. Liquid dentifrices are also included, such products usually containing larger amounts of active ingredients, e. g. 0.5-5%, dissolved in an aqueous mucilaginous vehicle, optionally combined with small amounts of abrasive, alcohol, glycerine, coloring and flavoring materials.

The following specific examples are further illustrative of the nature of the present invention, but it is to be understood that the invention is not limited thereto. All amounts of the various ingredients are by weight unless otherwise specified.

EXAMPLE I.—DENTAL CREAM

A suitable dental cream is prepared having approximately the following formulation:

| | Per cent |
|---|---|
| Calcium carbonate | 12.1 |
| Dicalcium phosphate dihydrate | 36.2 |
| Sodium N-lauroyl sarcoside | 2.0 |
| Glycerine | 30.6 |
| Water | 15.3 |
| Irish moss | 1.0 | the balance consisting essentially of sweetening agent, flavor, preservatives, etc. The glycerine, Irish moss, water and the minor amounts of preservatives and sweetener are mixed and heated to about 170° F. to form a gel-like mass. The sarcoside is added with agitation to form a homogeneous mass, after which the polishing agents in powder form are incorporated similarly. After cooling and adding the flavoring material, the mass is milled, deaerated and strained to produce a smooth, homogeneous cream paste, which is subsequently added to collapsible aluminum or lead tubes. This dental cream has a substantially neutral pH value. Extensive testing involving both in vivo and in vitro tests shows that this dental cream exhibits the desired properties with excellent uniformity and homogeneity of the cream.

The above active ingredient has been specified as the amide per se for convenience of illustration. This active ingredient contains a minor amount of several percent of sodium laurate. It was produced by the condensation of lauroyl chloride with sodium sarcosine in the presence of sodium hydroxide in an aqueous solution at a pH of about 10. The reaction mixture was acidified with aqueous sulfuric acid, and an aqueous layer was drawn off after settling. The residual oily layer containing the condensation mixture of amides and fatty acids was washed and treated with aqueous caustic to a pH of about 9 to form an essentially neutral solution of the sodium N-lauroyl sarcoside and minor amounts of sodium laurate and inorganic salts.

EXAMPLE II.—DENTAL CREAM

| | Per cent |
|---|---|
| Sodium N-lauroyl sarcoside | 2.0 |
| Calcium carbonate | 55.0 |
| Glycerine | 27.0 |
| Water | 14.0 |
| Gum, flavor, etc. | q. s. |

EXAMPLE III.—DENTAL CREAM

| | Per cent |
|---|---|
| Sodium N-lauroyl sarcoside | 1.5 |
| Dicalcium phosphate dihydrate | 58.5 |
| Water | 36.0 |
| Gum, flavor, etc. | q. s. |

EXAMPLE IV.—DENTAL CREAM

| | Per cent |
|---|---|
| Sodium N-lauroyl sarcoside | 2.0 |
| Aluminum hydroxide | 40.0 |
| Glycerine | 27.8 |
| Water | 27.8 |
| Gum, flavor, etc. | q. s. |

EXAMPLE V.—DENTAL CREAM

| | Per cent |
|---|---|
| Sodium N-lauroyl sarcoside | 2.0 |
| Dicalcium phosphate dihydrate | 56.5 |
| Sorbitol | 24.0 |
| Water | 14.2 |
| Gum, flavor, etc. | q. s. |

EXAMPLE VI.—DENTAL CREAM

| | Per cent |
|---|---|
| Sodium N-lauroyl sarcoside | 2.0 |
| Insoluble sodium metaphosphate | 56.2 |
| Glycerine | 26.0 |
| Water | 13.0 |
| Gum, flavor, etc. | q. s. |

EXAMPLE VII.—DENTAL CREAM

| | Per cent |
|---|---|
| Sodium N-myristoyl sarcoside | 2.0 |
| Dicalcium phosphate dihydrate | 53.5 |
| Glycerine | 27.7 |
| Water | 14.0 |
| Gum, flavor, etc. | q. s. |

EXAMPLE VIII.—DENTAL CREAM

| | Per cent |
|---|---|
| Sodium N-lauroyl glycide | 2.0 |
| Dicalcium phosphate dihydrate | 49.0 |
| Glycerine | 30.7 |
| Water | 15.5 |
| Gum, flavor, etc. | q. s. |

EXAMPLE IX.—DENTAL CREAM

| | Per cent |
|---|---|
| Sodium N-lauroyl sarcoside | 2.0 |
| Dicalcium phosphate dihydrate | 53.2 |
| Glycerine | 33.6 |
| Water | 8.4 |
| Gum, flavor, etc. | q. s. |

EXAMPLE X.—TOOTH POWDER

| | Per cent |
|---|---|
| Sodium N-lauroyl sarcoside | 2.8 |
| Saccharin, soluble | 0.2 |
| Flavor | 2.0 |
| Calcium carbonate | 25.0 |
| Dicalcium phosphate dihydrate | 70.0 |

EXAMPLE XI.—TOOTH POWDER

| | Percent |
|---|---|
| Sodium N-lauroyl sarcoside | 3.0 |
| Saccharin, soluble | 0.3 |
| Flavor | 2.5 |
| Dicalcium phosphate dihydrate | 94.2 |

EXAMPLE XII.—TOOTH POWDER

| | Percent |
|---|---|
| Sodium N-lauroyl sarcoside | 3.0 |
| Sodium metaphosphate | 85.0 |
| Dicalcium phosphate dihydrate | 10.00 |
| Flavor, etc. | q. s. |

EXAMPLE XIII.—MOUTH WASH

| | Percent |
|---|---|
| Sodium N-lauroyl sarcoside | 0.1–0.2 |
| Ethyl alcohol | 10.0 |
| Flavor | 0.15 |
| Saccharin, soluble | .012 |
| Distilled water | q. s. |

EXAMPLE XIV.—LIQUID DENTIFRICE

| | Percent |
|---|---|
| Sodium N-lauroyl sarcoside | 2.0 |
| Sodium carboxymethylcellulose | 4.0 |
| Flavor | 0.5 |
| Water | q. s. |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A dental preparation comprising a substantially saturated aliphatic acyl amide of a saturated aliphatic monoaminocarboxylic acid compound having 2 to 6 carbon atoms, the aliphatic acyl group having about 12 to 16 carbon atoms, and less than about 15% by weight based on said amide of higher fatty acid material, the amount of said material being insufficient to substantially adversely affect said amide.

2. A dental preparation in accordance with claim 1 in which the said amide is selected from the group consisting of N-lauroyl, myristoyl and palmitoyl sarcosides and the amount of said higher fatty acid material is less than about 10% by weight of said amide.

3. A dental preparation comprising sodium N-lauroyl sarcoside in an amount from about 0.05 up to 5% by weight and having less than 10 percent of higher fatty acid material based on the weight of sarcoside.

4. A dental preparation comprising an active ingredient in an amount up to 5 percent by weight thereof, said active ingredient being a substantially saturated N-fatty acyl sarcoside having 12 to 16 carbons in said acyl group, and having less than 15 percent based on the weight of said sarcoside of higher fatty acid material, the amount of said material being insufficient to substantially adversely affect said sarcoside.

5. A dental preparation in accordance with claim 4 in the form of a dentifrice comprising a polishing material and sodium N-lauroyl sarcoside having less than 10 percent of higher fatty acid material based on the weight of said sarcoside.

6. A dental preparation in accordance with claim 4 in the form of a dentifrice comprising a polishing material and sodium N-myristoyl sarcoside having less than 10 percent of higher fatty acid material based on the weight of said sarcoside.

7. A dental preparation in accordance with claim 4 in the form of a dentifrice comprising a polishing material and sodium N-palmitoyl sarcoside having less than 10 percent of higher fatty acid material based on the weight of said sarcoside.

8. A dental preparation in accordance with claim 4 in the form of a dentifrice comprising a polishing material and sodium N-lauroyl glycide having less than 10 percent of higher fatty acid material based on the weight of said glycide.

9. A dentifrice preparation comprising a polishing material and about 0.5–5% by weight of an amide having the formula:

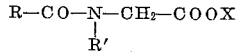

wherein R—CO— is a saturated fatty acyl radical of 12 to 16 carbon atoms, R' is selected from the class consisting of hydrogen and a lower alkyl radical having up to 4 carbon atoms, and X is selected from the class consisting of hydrogen and water-soluble salt-forming cations, and less than about 10% of higher fatty acid material based on the weight of said amide.

10. A dental cream comprising a liquid vehicle, a polishing material suspended in said liquid vehicle, a flavor, and about 0.5–5% by weight of an active ingredient selected from the group consisting of sodium N-lauroyl, N-myristoyl and N-palmitoyl sarcosides having less than about 10 percent of higher fatty acid material based on the weight of said active ingredient.

11. A tooth powder comprising a polishing material, a flavor and about 0.5–5 percent by weight of an active ingredient selected from the group consisting of sodium N-lauroyl, N-myristoyl and N-palmitoyl sarcosides having less than about 10 percent of higher fatty acid material based on the weight of said active ingredient.

12. A liquid dental preparation comprising a flavor and about .05 to 2% by weight of an active ingredient selected from the group consisting of sodium N-lauroyl, N-myristoyl and N-palmitoyl sarcosides having less than about 10 percent of higher fatty acid material based on the weight of said active ingredient.

13. A dental cream comprising, by weight:

| | Percent |
|---|---|
| Sodium N-lauroyl sarcoside | 1–3 |
| A polising material | 40–60 |
| A humectant | 10–40 |
| Water | 10–40 | said sarcoside having less than about 10 percent of higher fatty acid material based on the weight of said sarcoside.

14. A dental cream comprising by weight:

| | |
|---|---|
| Sodium N-lauroyl sarcoside | About 2% |
| A polishing material | About 48% |
| Glycerine | About 30% |
| Water | About 15% | said polishing material comprising a major proportion of dicalcium phosphate dihydrate and a minor proportion of calcium carbonate, less than about 10 percent of higher fatty acid material based on the weight of said sarcoside, and small amounts of gelling, sweetening, preserving and flavoring agents.

References Cited in the file of this patent

UNITED STATES PATENTS

| Number | Name | Date |
|---|---|---|
| 2,018,410 | McDonald et al. | Oct. 22, 1935 |
| 2,486,249 | Bird | Oct. 25, 1949 |

FOREIGN PATENTS

| Number | Country | Date |
|---|---|---|
| 635,522 | Germany | Sept. 18, 1936 |
| 675,837 | Germany | Apr. 27, 1939 |
| 435,481 | Great Britain | Sept. 23, 1935 |
| 450,467 | Great Britain | July 17, 1936 |
| 456,142 | Great Britain | Nov. 3, 1936 |
| 459,039 | Great Britain | Dec. 28, 1936 |
| 461,328 | Great Britain | Feb. 15, 1937 |
| 787,819 | France | July 6, 1935 |
| 795,052 | France | Dec. 26, 1935 |

OTHER REFERENCES

Soap ("Detergents"), May 1940, pp. 35 and 67.

Kosmetische, Reichstoff-U. Parfumerie-Industrie, September 1951, pp. 479 and 480.

Science News Letter, August 29, 1953, p. 131.

Jour. of Soc. of Cosmetic Chemists, December 1950, p. 70.

Oral Surgery, Oral Med., and Oral Path., April 1949, p. 471.

Jour. Amer. Dent. Assn., February 1954, pp. 134–139, 201 and 202.

Jour. Amer. Dent. Assn., September 1953, pp. 349, 354, 355 and 365.